(12) United States Patent
Luo et al.

(10) Patent No.: US 7,461,371 B2
(45) Date of Patent: Dec. 2, 2008

(54) GENERAL PURPOSE MEMORY COMPILER SYSTEM AND ASSOCIATED METHODS

(75) Inventors: Ruei-chin Luo, San-Chung (TW); Samuel Chiang, Taipei (TW); Chen-han Lien, Tainan (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 531 days.

(21) Appl. No.: 10/659,848

(22) Filed: Sep. 11, 2003

(65) Prior Publication Data
US 2005/0060500 A1 Mar. 17, 2005

(51) Int. Cl.
G06F 9/45 (2006.01)
G06F 9/44 (2006.01)
G06F 12/00 (2006.01)
G11C 5/06 (2006.01)
G11C 17/00 (2006.01)

(52) U.S. Cl. ............... 717/167; 717/140; 717/148; 711/147; 365/63; 365/94

(58) Field of Classification Search ............... None
See application file for complete search history.

(56) References Cited

U.S. PATENT DOCUMENTS 5,493,508 A * 2/1996 Dangelo et al. ............... 716/5
5,703,789 A * 12/1997 Beausang et al. ............... 716/4
6,157,947 A * 12/2000 Watanabe et al. ............ 709/217
6,578,174 B2 * 6/2003 Zizzo ............................ 716/1
2002/0038401 A1 * 3/2002 Zaidi et al. ................... 710/305
2002/0046324 A1 * 4/2002 Barroso et al. ............... 711/122

* cited by examiner

Primary Examiner—Chuck O Kendall
(74) Attorney, Agent, or Firm—Haynes and Boone, LLP

(57) ABSTRACT

An enhanced memory compiler system and associated methods are provided. In one example, a method for accessing a plurality of memory compiler units includes: prompting, via a multi-compiler interface, for a selection of a first memory compiler unit from a plurality of memory compiler units; remotely linking to the selected first memory compiler unit; and generating a combination datasheet comprising a plurality of memory instances. In another example, a system for providing a combination datasheet to a remote computer includes a plurality of memory compiler units, and each memory compiler unit includes a program for assisting a multi-compiler interface to generate a combination datasheet, and the combination datasheet includes memory instances created by at least two of the plurality of memory compiler units.

20 Claims, 12 Drawing Sheets

Fig. 4

0.25um Embedded Flash Compiler

| Library Name | sfc128kx8m64p4r2_100a — 432 | | |
|---|---|---|---|
| Word Depth | 131072 — 414<br>1024–131072 step by 128 | | |
| Word Width | 8 ▼ — 416 | | |
| Column Mux Option | 64 ▼ (# of bit line per I/O) | | |
| Page Option | 4 ▼ (# of word line per page)<br>Page Size=2048 bits | | |

Compiled instance footprint — 416

| | Without power ring | With 20um power ring |
|---|---|---|
| Height | 2839.64 um | 2891.64 um |
| Width | 736 um | 790 um |
| Area | 2089975.04 um² | 2284395.6 um² |
| aspect ratio | 0.259 | 0.273 |

— 430

[ Timing Specification ] — 422

Power Ring/Ring Placement Type:
◉ Type 2  🗐 Description — 426

Pin Routing Layer: MET1 ▼
Metal Layer Signal
Lower MET1 ▼   VDD ▼
Upper MET1 ▼   VDD ▼
— 428

[ Next ]  [ Reset ] — 424

*Fig. 5*

| Datasheet | |
|---|---|
| Library Name | sfc128kx8m64p4p4r2_100a |
| Word Depth | 131072 |
| Word Width | 8 |
| Column Mux Option | 64 |
| Page Option | 4 |
| Page Size | 2048 bits |
| Chip Height | 2839.64 um |
| Chip Width | 736 um |
| Area | 2089975.04 um² |
| Aspect Ratio | 0.259 |

DC Electrical Characteristic($T_J$=0°C to 125°C, $V_{DD}$=2.25V to 2.75V, $V_{SS}$=0V)

| Parameter | Symbol | Unit | Specification $T_j$=0~125°C |
|---|---|---|---|
| Read operation current | IDD1 | mA | 8 |
| Program operation current | | mA | 7 |
| Erase current | | mA | 5 |
| Mass erase current | | mA | 5 |
| Static read current | IDD2 | mA | 5 |
| Standby current | ISB | uA | 10 |

Timing Parameters ($T_J$=0°C to +125°C, $V_{DD}$=2.25V to 2.75V, $V_{SS}$=0V, CLOAD=1pF) User mode

| Parameter | Symbol | Unit | Timing Numbers | |
|---|---|---|---|---|
| | | | Min | Max |
| X address access time | Txa | ns | - | 50 |
| Y address access line | Tya | ns | - | 50 |
| OE access time | Toa | ns | - | 5 |
| PROG/ERASE to NVSTR set up time | Tnvs | us | 5 | - |
| NVSTR hold time | Tnvh | us | 5 | - |
| NVSTR hold time (mass erase) | Tnvh1 | us | 100 | - |
| NVSTR to program set up time | Tpgs | us | 10 | - |
| program hold time | Tpgh | ns | 20 | - |
| program time | Tprog | us | 20 | 40 |
| address/data set up time | Tads | ns | 20 | - |
| address/data hold time | Tadh | ns | 20 | - |
| recovery time | Trcv | us | 1 | - |
| Erase time | Terase | ms | 20 | - |
| Mass erase time | Tme | ms | 200 | - |

[ Add a new IP ]  [ Save as file ]  [ Clean All DataSheet ]

Fig. 6

| 0.25 um Embedded Flash Compiler | |
|---|---|
| Library Name | sfc128kx8m64p4r2_100a |
| Number of Words | 131072 (128k) |
| Word Width | 8 |
| Column Mux Option | 64 |
| Page Option | 4 |
| Power Ring | Ring Placement Type 2 |
| Pin Routing Layer<br>MET1 | Metal Layer   Signal<br>Lower MET2      VDD<br>Upper MET3      VSS |
| P V T Table | <table><tr><th>P</th><th>V</th><th>T</th><th>Name</th></tr><tr><td>T</td><td>2.50</td><td>25</td><td>Typical</td></tr><tr><td>F</td><td>2.75</td><td>0</td><td>Fast</td></tr><tr><td>S</td><td>2.25</td><td>125</td><td>Slow</td></tr></table> |

602 — Confirm

Fig. 7

| Customer Information | |
|---|---|
| •Company Name | |
| •Region | |
| Tel Number | |
| •E-mail | |
| Design Application | |
| FTP account | Please input your login account/password<br>FTP account [    ]<br>FTP Password [**********] |

702 — Submit   Reset

• the entry is mandatory

700

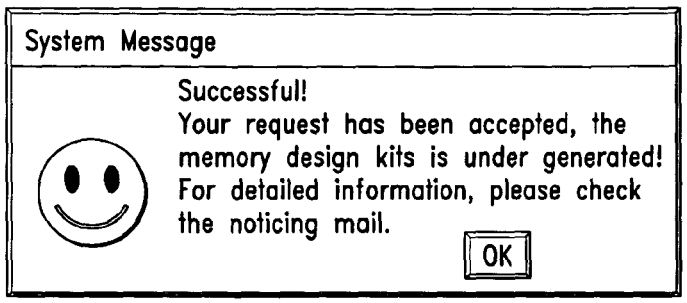

| VIEWS | FILE EXTENSION | COMMENTS |
|---|---|---|
| CALIBRE NETLIST | .cali_cdl | NETLIST FOR CALIBRE LVS |
| HERCULES NETLIST | .herc_cdl | NETLIST FOR HERCULES LVS |
| LAYOUT | .gds | GDS FILE FOR FLASH INSTANCE |
| VERILOG | .v & .v_pg | VERILOG BEHAVIOR MODELS. .v DOESN'T HAVE THE LOCAL FLASH VDD AND AND VSS. .v_pg HAS THE LOCAL VDD AND VSS. |
| SYNOPSYS | .lib & .lib_pg | TIMING MODEL FOR SYNOPSYS. .lib DOESN'T HAVE THE LOCAL VDD AND VSS. .lib_pg HAS THE LOCAL VDD AND VSS. |
| APOLLO FRAME | .fram | APOLLO LAYOUT ABSTRACTION FOR ROUTABILITY. IT HAS SIZE, PIN LOCATION, BLOCKAGE INFORMATION. IT IS IN BINARY FORMAT. |
| APOLLO CELL | .cel | MILKYWAY FORMAT LAYOUT. IT HAS EVERYTHING EXCEPT IN DIFFERENT FILE FORMAT AS A gds FILE. |
| APOLLO TIMING | .tim | TIMING INFORMATION FOR APOLLO. |
| PHANTOM | .phantom_gds | TOP LEVEL LAYOUT INFORMATION. A PSUB TAB IS ADDED TO PASS THE LVS CHECK FROM THE APOLLO. |
| PHANTOM NETLIST | .phantom_cdl | TOP LEVEL NETLIST INFORMATION. |
| LIBRARY LEF (PHANTOM) | .lef | CADENCE LAYOUT ABSTRACTION FOR ROUTABILITY. |
| ANTENNA CLF | .antenna_clf | INPUT AND OUTPUT PINS GATE AREAS, SOURCE AND DRAIN AREA IN AVANT'S FORMAT. |
| ANTENNA LEF | .antenna_lef | INPUT AND OUTPUT PINS GATE AREAS, SOURCE AND DRAIN AREA IN CADENCE'S FORMAT. |
| DATA SHEET | .ds and .pdf | DOCUMENTATION FOR THE FLASH INSTANCE. .ds IS IN ASCII FORMAT WHILE .pdf IS IN pdf FORMAT. (.pdf FORMAT DATASHEET ISN'T AVAILABLE AT THIS MOMENT, IT WILL BE AVAILABLE WITH FUTURE RELEASE). |

Fig. 11

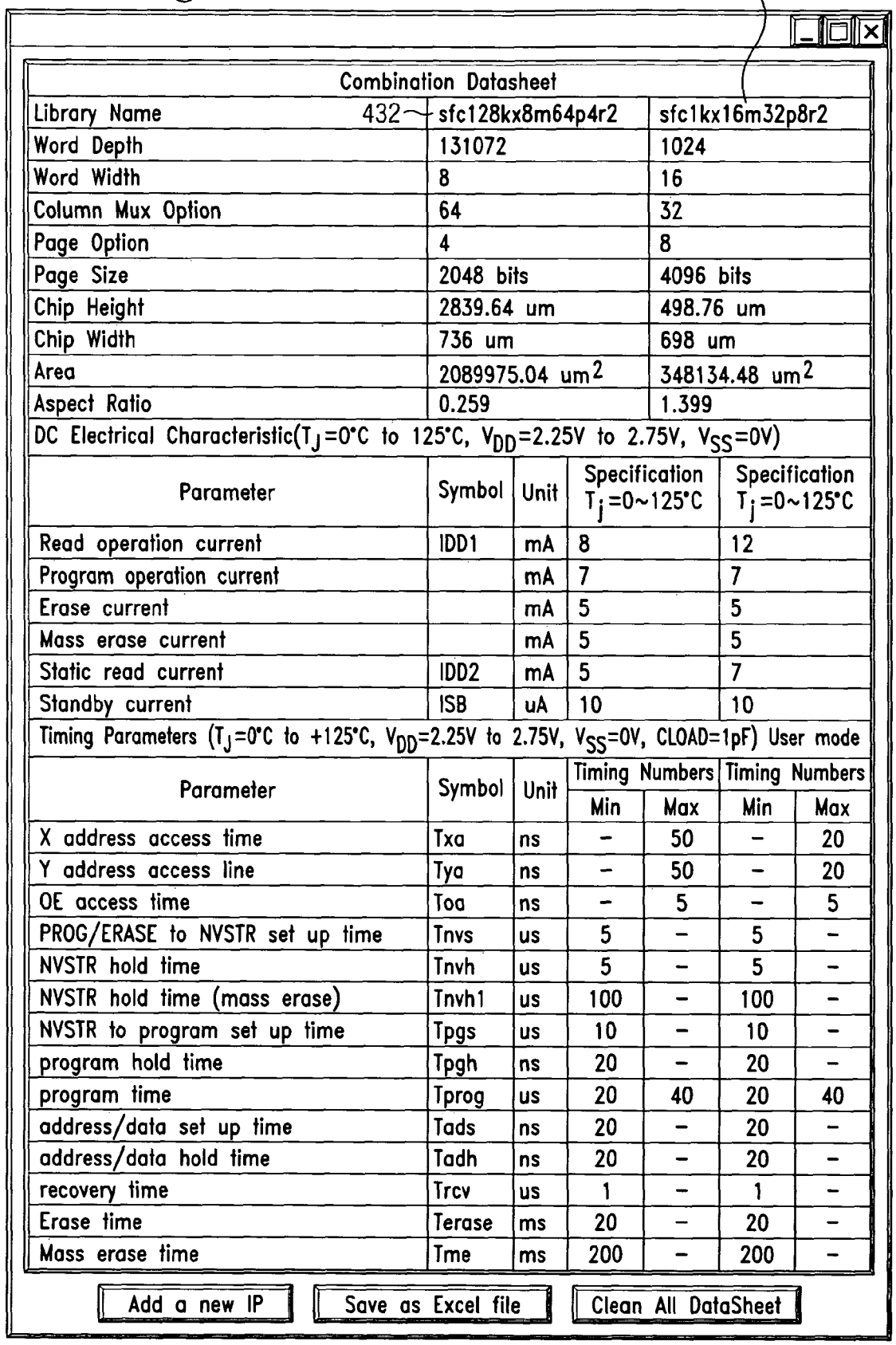

| Combination Datasheet | | |
|---|---|---|
| Library Name 432 | sfc128kx8m64p4r2 | sfc1kx16m32p8r2 |
| Word Depth | 131072 | 1024 |
| Word Width | 8 | 16 |
| Column Mux Option | 64 | 32 |
| Page Option | 4 | 8 |
| Page Size | 2048 bits | 4096 bits |
| Chip Height | 2839.64 um | 498.76 um |
| Chip Width | 736 um | 698 um |
| Area | 2089975.04 um$^2$ | 348134.48 um$^2$ |
| Aspect Ratio | 0.259 | 1.399 |
| DC Electrical Characteristic($T_J$=0°C to 125°C, $V_{DD}$=2.25V to 2.75V, $V_{SS}$=0V) | | |

| Parameter | Symbol | Unit | Specification $T_j$=0~125°C | Specification $T_j$=0~125°C |
|---|---|---|---|---|
| Read operation current | IDD1 | mA | 8 | 12 |
| Program operation current | | mA | 7 | 7 |
| Erase current | | mA | 5 | 5 |
| Mass erase current | | mA | 5 | 5 |
| Static read current | IDD2 | mA | 5 | 7 |
| Standby current | ISB | uA | 10 | 10 |

Timing Parameters ($T_J$=0°C to +125°C, $V_{DD}$=2.25V to 2.75V, $V_{SS}$=0V, CLOAD=1pF) User mode

| Parameter | Symbol | Unit | Timing Numbers | | Timing Numbers | |
|---|---|---|---|---|---|---|
| | | | Min | Max | Min | Max |
| X address access time | Txa | ns | – | 50 | – | 20 |
| Y address access line | Tya | ns | – | 50 | – | 20 |
| OE access time | Toa | ns | – | 5 | – | 5 |
| PROG/ERASE to NVSTR set up time | Tnvs | us | 5 | – | 5 | – |
| NVSTR hold time | Tnvh | us | 5 | – | 5 | – |
| NVSTR hold time (mass erase) | Tnvh1 | us | 100 | – | 100 | – |
| NVSTR to program set up time | Tpgs | us | 10 | – | 10 | – |
| program hold time | Tpgh | ns | 20 | – | 20 | – |
| program time | Tprog | us | 20 | 40 | 20 | 40 |
| address/data set up time | Tads | ns | 20 | – | 20 | – |
| address/data hold time | Tadh | ns | 20 | – | 20 | – |
| recovery time | Trcv | us | 1 | – | 1 | – |
| Erase time | Terase | ms | 20 | – | 20 | – |
| Mass erase time | Tme | ms | 200 | – | 200 | – |

[ Add a new IP ]  [ Save as Excel file ]  [ Clean All DataSheet ]

| Datasheet | |
|---|---|
| Library Name | 1214— tsdfa2kx128m4r2_100a |
| Word Depth | 2048 |
| Word Width | 128 |
| Column Mux Option | 4 |
| Power Ring Width | 10.1 um |
| Chip Height | 1242.16 um |
| Chip Width | 1497.22 um |
| Area | 1859786.795 um² |
| Aspect Ratio | 1.205 |
| Frequence | 100 MHz |

DC Electrical Characteristic($T_J$=0°C to 125°C, $V_{DD}$=1.35V to 1.65V, $V_{SS}$=0V)

| Parameter | Symbol | Fast process 1.65V, 0C | Typical process 1.5V, 25C | Slow process 1.35V, 125C |
|---|---|---|---|---|
| A-port cycle time (ns) | tcyca | 3.465 | 4.97 | 8.421 |
| B-port cycle time (ns) | tcycb | 3.465 | 4.97 | 8.421 |
| A-port access time (ns) | taa | 3.394 | 4.861 | 8.185 |
| B-port access time (ns) | tab | 3.394 | 4.861 | 8.185 |
| A-port address setup (ns) | tasa | 0.261 | 0.26 | 0.486 |
| B-port address setup (ns) | tasb | 0.261 | 0.26 | 0.486 |
| A-port address hold (ns) | taha | 0 | 0 | 0.1 |
| B-port address hold (ns) | tahb | 0 | 0 | 0.1 |
| A-port chip enable setup (ns) | tcsa | 0.225 | 0.287 | 0.416 |
| B-port chip enable setup (ns) | tcsb | 0.225 | 0.287 | 0.416 |

TO Fig. 13B

FROM Fig. 13A

| | | | | |
|---|---|---|---|---|
| A-port chip enable hold (ns) | tcha | 0 | 0 | 0 |
| B-port chip enable hold (ns) | tchb | 0 | 0 | 0 |
| A-port write enable setup (ns) | twsa | 0.153 | 0.196 | 0.273 |
| B-port write enable setup (ns) | twsb | 0.153 | 0.196 | 0.273 |
| A-port write enable hold (ns) | twha | 0 | 0 | 0 |
| B-port write enable hold (ns) | twhb | 0 | 0 | 0 |
| A-port output enable (ns) | toea | 0.498 | 0.654 | 1.091 |
| B-port output enable (ns) | toeb | 0.498 | 0.654 | 1.091 |
| A-port output hi-z (ns) | toza | 0.585 | 0.546 | 1.042 |
| B-port output hi-z (ns) | tozb | 0.585 | 0.546 | 1.042 |
| A-port data setup (ns) | tdsa | 0.213 | 0.262 | 0.261 |
| B-port data setup (ns) | tdsb | 0.213 | 0.262 | 0.261 |
| A-port data hold (ns) | tdha | 0 | 0 | 0 |
| B-port data hold (ns) | tdhb | 0 | 0 | 0 |
| A-port clock high (ns) | tckha | 0.3 | 0.393 | 0.447 |
| B-port clock high (ns) | tckhb | 0.3 | 0.393 | 0.447 |
| A-port clock low (ns) | tckla | 0.382 | 0.42 | 0.489 |
| B-port clock low (ns) | tcklb | 0.382 | 0.42 | 0.489 |
| A & B port clock collision (ns) | tcc | 0.791 | 1.069 | 1.642 |
| Output load factor | Kload | 0.166 | 0.215 | 0.236 |
| AC current mA/port-MHz | | 0.321 | 0.282 | 0.246 |
| Read AC current mA/port-MHz | | 0.303 | 0.263 | 0.221 |
| Write AC current mA/port-MHz | | 0.34 | 0.302 | 0.272 |
| Standby current uA | | 10.133 | 11.898 | 37.812 |

[ Add a new IP ]  [ Save as Excel file ]  [ Clean All DataSheet ]

| VIEWS | FILE EXTENSION | COMMENTS |
|---|---|---|
| LVS NETLIST | .spi | NETLIST FOR LVS |
| LAYOUT | .gds | GDS FILE FOR FLASH INSTANCE |
| VERILOG | .v | .V: VERILOG BEHAVIOR MODELS DOESN'T HAVE THE LOCAL VDD AND VSS. |
| SYNOPSYS | .lib & .lib_pg | .lib: TIMING MODEL FOR SYNOPSYS DOESN'T HAVE THE LOCAL VDD AND VSS. .lib_pg: HAS THE LOCAL VDD AND VSS. |
| APOLLO FRAME | .fram | APOLLO ABSTRACT VIEW FOR ROUTABILITY. IT CONTAINS SIZE, PIN LOCATIONS, AND BLOCKAGE INFORMATION IN BINARY FORMAT. |
| APOLLO CELL | .cel | LAYOUT INFORMATION IN MILKYWAY FORMAT. IT CONTAINS THE SAME INFORMATION AS A gds FILE, BUT IN DIFFERENT FORMAT. |
| APOLLO TIMING | .tim | TIMING INFORMATION FOR APOLLO |
| 1LIBRARY LEF (PHANTOM) | .lef | CADENCE ABSTRACT VIEW FOR ROUTABILITY |
| ANTENNA CLF | .antenna_clf | INPUT AND OUTPUT PINS GATE AREAS, SOURCE AND DRAIN AREA IN AVANT'S FORMAT. |
| ANTENNA LEF | .antenna_lef | INPUT AND OUTPUT PINS GATE AREAS, SOURCE AND DRAIN AREA IN CADENCE'S FORMAT. |
| DATA SHEET | .ds and .pdf | DATASHEET IN ASCII FORMAT. |

*Fig. 14*

GENERAL PURPOSE MEMORY COMPILER SYSTEM AND ASSOCIATED METHODS

FIELD OF THE INVENTION

This invention relates generally to memory compiler systems. More particularly, the present invention relates to a memory compiler system accessible through a single platform.

BACKGROUND

Memory is a structure where information can be stored and retrieved. In the most general sense, memory can refer to external storage such as disk drives or tape drives. It can also refer to a plurality of discrete devices or embedded memory cells in another device (such as a processor or controller) used by a computing device such as a processor for a personal computer, a wireless telephone, a personal digital assistant, a digital watch, and/or many other items.

Circuit design includes many different aspects, one of which is to design a specific memory configuration based on a plurality of design requirements. For example, there are many types of memory that can be used either alone or in combination for a desired circuit design. Examples of different memory types, with different parameters and requirements associated there with, include flash memory, electrically erasable programmable read-only memory (EEPROM), and static random access memory (SRAM).

Traditionally, memory configurations for a circuit design are processed manually. However, manual design processes require extensive resources and are prone to errors, and are especially inefficient for designers who merely include standard memory design or embedded memory design into their systems.

More recently, progress has been made to automate the manual design processes. One advancement is the utilization of memory compilers, which generate memory related design files based on design specifications. The design files are used for purposes of synthesis, function simulation, verification, layout, floor planning, placement, and routing. The design files can often be used in one or more Electronic Design Automation (EDA) tools, such as Synopsis liberty model, Verilog model, spice netlist, LER, Apollo CELL, and Apollo FRAM view.

However, previous memory compilers possess many problems. And the present invention is directed toward solving a number of those problems.

SUMMARY

In one embodiment, a method for accessing a plurality of memory compiler units comprises: prompting, via a multi-compiler interface, for a selection of a first memory compiler unit from a plurality of memory compiler units; remotely linking to the selected first memory compiler unit; and generating a combination datasheet comprising a plurality of memory instances.

In another embodiment, a computer readable medium comprising a plurality of instructions for execution by at least one computer processor, wherein the instructions are for: prompting a user to select a memory compiler unit; linking to a selected memory compiler unit; and generating a combination datasheet comprising a plurality of memory instances wherein at least two of the plurality of memory instances are created by different memory compiler units.

In a third embodiment, a system for providing a combination datasheet to a remote computer, the system comprising a plurality of memory compiler units wherein each memory compiler unit comprises a program for assisting a multi-compiler interface to generate a combination datasheet wherein the combination datasheet comprises memory instances created by at least two of the plurality of memory compiler units.

BRIEF DESCRIPTION OF THE DRAWINGS

FIG. 4 illustrates an exemplary screen display for soliciting inputs to parameters according to the method of FIG. 3b.

FIG. 5 illustrates an exemplary datasheet.

FIG. 6 illustrates an exemplary screen display associated with generating design files.

FIG. 7 illustrates an exemplary login screen display.

FIG. 8 illustrates an exemplary system message.

FIG. 9 illustrates an exemplary list of design files generated according to the method of FIG. 3b.

FIG. 11 illustrates a combination datasheet comprising more than one memory instances according to one embodiment of the present invention.

FIG. 13 illustrates an exemplary datasheet.

FIG. 14 illustrates an exemplary list of design files.

DETAILED DESCRIPTION

Figure 1:
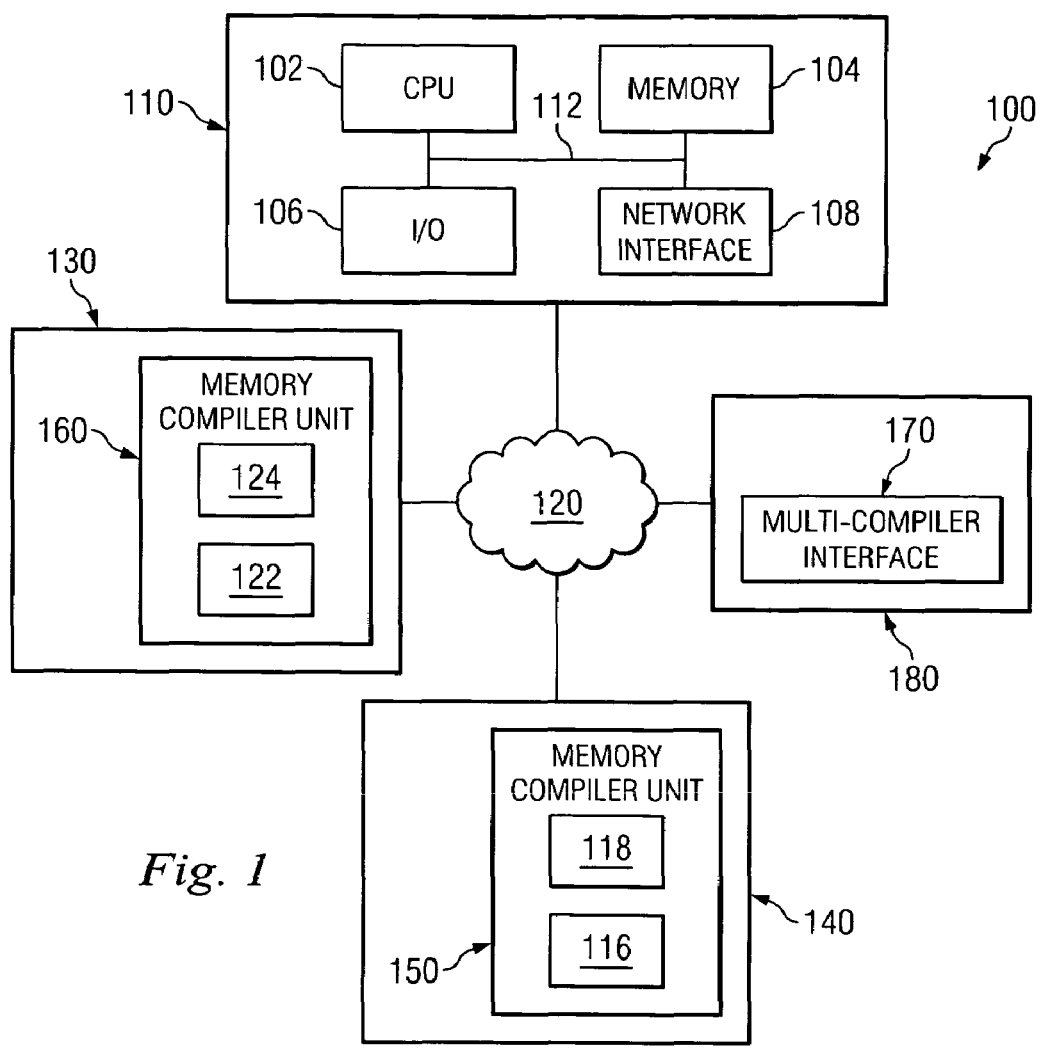
FIG. 1 illustrates a block diagram of a communication system that may be used to implement one embodiment of the present invention.

Previous memory compilers possess a number of problems. For example, memory compilers must be installed on a user's site to generate design files. Further, utilizing different memory compilers may be challenging, as each memory compiler may reside on a separate and incompatible platform. Moreover, it is difficult to compare timing specifications among memory instances, as each datasheet includes only a single memory instance.

Therefore, it is desired to provide memory compilers that can be accessed from anywhere and at anytime. It is also desired to provide memory compilers that are accessible through a single platform. It is further desired to provide datasheets comprising multiple memory instances, so that comparison of timing specifications can be easily accomplished.

The present invention provides an enhanced memory compiler system and associated methods. It is directed toward solving a number of the problems existing in the previous memory compilers. For example, the present invention may add an interface to access multiple existing memory compilers. As a result, without local installation of memory compilers, users may easily access memory compilers through the internet.

For the purposes of promoting an understanding of the principles of the invention, reference will now be made to the embodiments, or examples, illustrated in the drawings and specific languages will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring now to FIG. 1, in one embodiment, an exemplary system 100, which may comprise a computer 110, a network 120, two memory compiler servers 130 and 140, and a server 180 may be used to implement the present invention. The computer 110 may include a central processing unit (CPU) 102, a memory unit 104, an input/output (I/O) device 106, which may include a computer screen, and a network interface 108. It is contemplated that the computer 110 may be replaced by other computing devices, such as a wireless telephone or personal digital assistant. A multi-compiler interface 170 may reside on the server 180, and it may comprise any suitable program, such as a Hypertext Markup Language (HTML) program or Java program. It is contemplated that the multi-compiler interface 170 may reside on any other server, such as the servers 130 or 140.

The components 102, 104, 106 and 108 are interconnected by a bus system 112. It will be understood that the computer 110 may be configured differently, and that each of the listed components may represent several different components. For example, the CPU 102 may represent a multi-processor or a distributed processing system; the memory unit 104 may include different levels of cache memory, main memory, hard disks, and remote storage locations; and the I/O device 106 may include monitors, keyboards, and the like.

The computer 110 and servers 130, 140 and 180 may be connected to the network 120. The network 120 may represent several networks, such as a local area network, a company wide intranet, and/or the Internet. Therefore, the configuration of FIG. 1 is simplified for the sake of example. It is contemplated that at least one of the memory compiler units (e.g., memory compiler unit 150) and the multi-compiler interface 170 may reside on the same sever or separate servers. Likewise, the computer 110 and multi-compiler interface 170 may reside on the same sever or separate servers. In addition, the computer 110 may act as a server to other computers (not show). Therefore, a wide range of flexibility is anticipated in the configuration of the system 100. The servers 130, 140 and 170 may comprise structures similar to that of the computer 100, or they may comprise other conventional structures known in the art.

In the present example, the computer 110 may be one that is used by a memory designer, and the memory compiler servers 130, 140 may be provided by one or more memory providers. In this example, the memory compiler server 140 includes a memory compiler unit 150, which may comprise an interface program 118 and a memory compiler 116. Another memory compiler unit 160, which may also comprise an interface program 124 and a memory compiler 122, resides on the server 130. In the description that follows, the description of the interface program 118 shall apply with like effect to the interface program 124. Likewise, the description of the memory compiler 116 shall apply with like effect to the memory compiler 122.

In furtherance of the present example, the multi-compiler interface 170 can be a separate entity altogether, or may be associated with one or more of the memory providers discussed with reference to the memory compiler servers 130 and/or 140. For example, the multi-compiler interface 170 may represent a generic interface that has access to many different memory providers. Alternatively, the multi-compiler interface 170 and the two memory compiler servers 130 and 140 may all be associated with a single memory provider. The multi-compiler interface 170 may be associated with the World Wide Web or a more generic information-sharing node.

In this example, the interface programs 118 may comprise any suitable program, such as a Java program or script, that in the present example, can interface with the multi-compiler interface 170. In operation, the interface programs 118 may interact with the memory designer directly through the computer 110 (not including any inherent, intermediate nodes), or indirectly through the multi-compiler interface 170. In one example, the interface program 118 may solicit user specifications from the computer 110 through its own web-based screen display, to customize the design of a memory instance. Based on the user specifications, the interface program 118 will generate a datasheet that includes the customized memory instance (an exemplary datasheet is illustrated in FIG. 5). To enable the IC designer to easily compare various designs, the multi-compiler interface 170 may generate and display a combination datasheet comprising a plurality of memory instances (some of them may be created by different memory compiler units). In addition, the interface program 118 may act as an intermediate between the web-based screen display and the memory compiler 116. It may translate or transfer the user specifications to the memory compiler 116, and invoke the memory compiler 116.

The memory compiler 116 may comprise any suitable program, such as a C or C++ program. It generates design files for the customized memory instance based on the user specifications. Design files are also known as design kits or EDA views. They are used for purposes of synthesis, function simulation, verification, layout, floor planning, placement, and routing. Generally, design files may support most of the major Electronic Design Automation (EDA) tools, such as Synopsis liberty model, Verilog model, spice netlist, LER, Apollo CELL, and Apollo FRAM view. FIG. 9 illustrates an exemplary list of design files.

In one example, a provider of memory compiler units may take advantage of the exemplary system 100 as follows: the provider may provide the memory compiler units 150, 160 and other memory compiler units through the internet. The multi-compiler interface 170 is notified of the different memory compiler units 150, 160. A user of the memory compiler units may be an integrated circuits (IC) designer who needs to include memory devices in his system. The IC designer may access the multi-compiler interface 170 through the computer 110. As a result, the IC designer may be linked to the memory compiler servers 130 and 140 through the Internet. For example, he may design a memory instance utilizing the memory compiler unit 150, which may be a 0.25 um embedded flash compiler system. Through a web page on one of the memory compiler unit 150, the IC designer may enter specifications to the 0.25 um embedded flash compiler system to customize his design. Based on those specifications, the interface program 118 will produce a datasheet for the customized memory instance, and the memory compiler 116 will produce design files for the customized memory instance.

It is contemplated that the interface program 118 and the memory compiler 116 may reside on the same server or separate servers. In one example, a program may comprise both the interface program 118 and the multi-compiler interface 170. It is contemplated that the multi-compiler interface 170 and either or both of the memory compiler units 150 and 160 may reside on the same server. It is also contemplated that additional memory compiler units may reside on the server 130, the server 140, or other servers in the system 100. It is further contemplated that the interface program 118 may be a part of the memory compiler 116.

Figure 2:
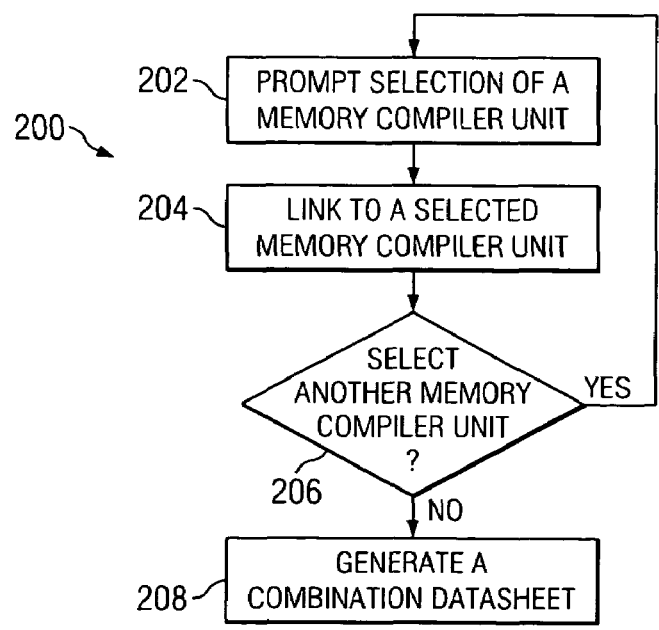
FIG. 2 illustrates a flowchart of an exemplary method according to one embodiment of the present invention.

Referring now to FIG. 2, one exemplary method 200 for providing a single-platform access to a plurality of memory compiler units is illustrated. There, all the steps of the method 200 may be provided through the multi-compiler interface 170. The method 200 begins with step 202, which prompts a user to select a memory compiler unit.

Figure 3A:
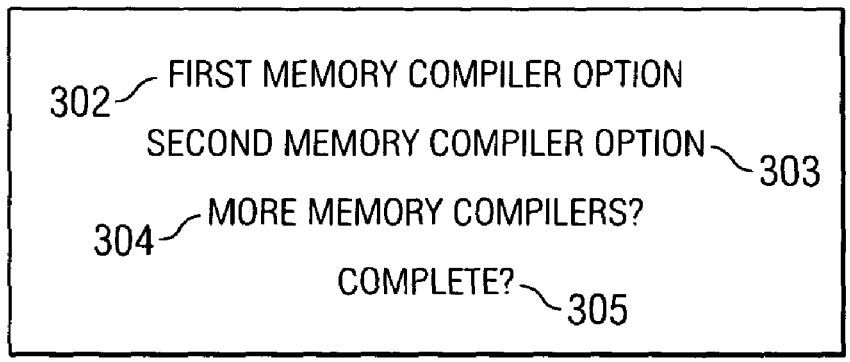
FIG. 3a illustrates step 202 of FIG. 2 according to one embodiment of the present invention.

Referring also to FIG. 3a, in one embodiment, the multi-compiler interface 170 (FIG. 1) may provide an exemplary screen display 300a for a user to select a memory compiler unit. The screen display 300a can be implemented in Hypertext Markup Language (HTML), it being understood that HTML files and their associated functions are known in the art.

The screen display 300a can display links to a plurality of memory compiler units, which may comprise any type of memory compiler unit, such as a read-only memory (ROM) compiler unit, a random access memory (RAM) compiler unit, an embedded direct read after write (DRAM) compiler unit, a flash memory compiler unit, or a static RAM compiler unit. It will be understood that those memory compiler units are known in the art and will not be described in details herein.

In the illustration of FIG. 3a, the exemplary screen display 300a shows hyperlinks 302, 303 to two memory compiler "options." For example, a first memory compiler option may be for a 0.25 um embedded flash compiler unit and the second memory compiler option may be for a 0.13 um dual port SRAM compiler unit. A user, who may be an IC designer or an engineer, may select either of those systems by clicking their respective hyperlinks. Subsequently, the multi-compiler interface 170 may cause a new screen that is associated with the selected hyperlink to be displayed, to be discussed in greater detail below.

Referring again to FIG. 2, at step 204 a selected memory compiler unit is accessed according to the selected link of step 202. For the sake of example, the selected hyperlink is directed to the memory compiler system 150 of FIG. 1. Once accessed, the memory compiler system 150 (in the present example) prompts the user for configuration data, as required.

Figure 3B:
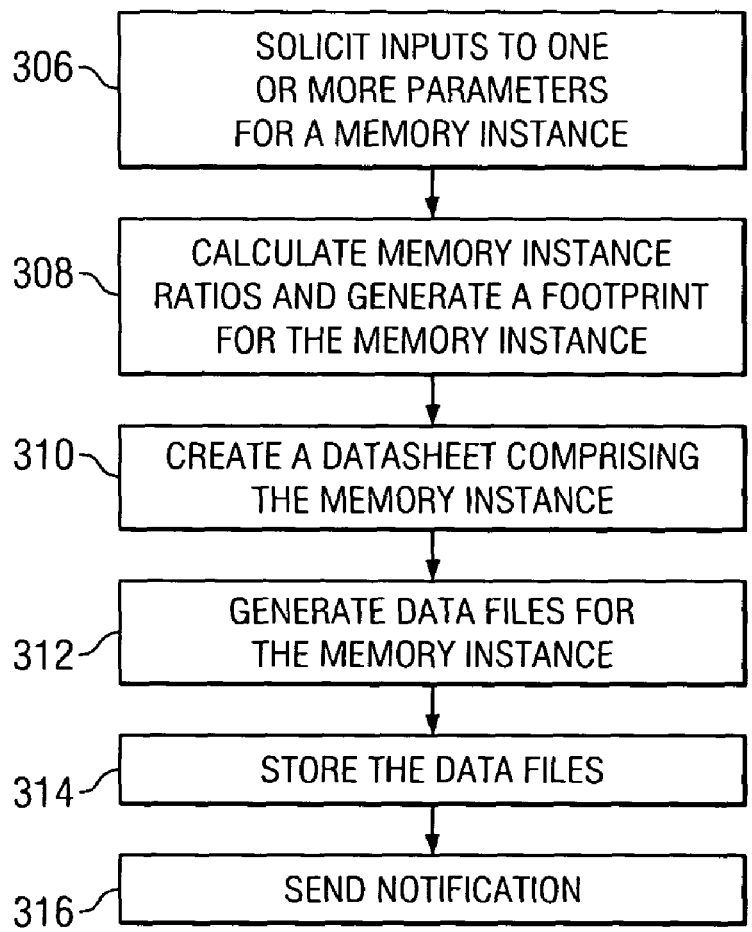
FIG. 3b illustrates step 204 of FIG. 2 according to one embodiment of the present invention.

Referring also to FIG. 3b, in one embodiment, the memory compiler system 150 conducts a method 300b to obtain the configuration data. The method 300b begins with step 306, which solicits inputs to one or more parameters for a memory instance. Step 308 calculates memory instance ratios and generates a footprint for the memory instance. Step 310 creates a datasheet comprising the memory instance based on the inputs to the one or more parameters, and step 312 generates design files for the memory instance. Step 314 stores the data files (e.g., a data sheet) in a predetermined location. The predetermined location may actually include multiple locations, one of which being associated with the user computer 110 and another associated with, or identifiably by, the multi-compiler interface 170. Step 316 provides notification to a user, such as by emailing, so the user will know whether the design files have been generated and where they are located. In addition, if the data files are stored somewhere previously unknown by the multi-compiler interface 170, notification can also be provided to the web server or the data file can be sent directly to the webs server.

In this example, the interface program 118 (FIG. 1) may perform the steps 306, 308, and 310; and the memory compiler 116 may perform the steps 312, 314 and 316. It is contemplated that each of the interface program 118 and the memory compiler 116 may comprise a fewer or a greater number of the steps from the method 300b. It is further contemplated that the method 300b may comprise a fewer or greater number of steps.

Referring again to FIGS. 2 and 3a, at step 206, a determination is made as to whether additional memory compiler systems will be accessed (or if the previous systems will be re-accessed with different data). In one embodiment, this determination can be made by merely selecting a different link 302, 303 on the screen display 300a. Alternatively, links 304 and/or 305 can be provided to indicate whether more memory compilers are to be accessed. In yet another embodiment, the multi-compiler interface 170 may include intelligence to identify additional links based on the information provided to the memory compilers. If more compilers are to be accessed, execution proceeds to step 202 so that additional memory compiler units can be accessed.

If at step 206 it is determined that there are no more memory compilers to access, execution proceeds to step 208. At step 208, the multi-compiler interface 170 may generate a combination datasheet comprising a plurality of memory instances. The plurality of memory instances may be created by a single memory compiler unit (e.g., memory compiler unit 150 or 160) or by a plurality of different memory compiler units (e.g., memory compiler units 150 and 160). FIG. 11, which will be further described below, illustrates an exemplary combination datasheet.

The following description will provide several more detailed examples of the system and methods discussed above. It is understood that these are examples provided to teach the broader inventive concept.

Step 204 of FIG. 2.

Referring to FIG. 4, in one embodiment, the first memory compiler option 302, a 0.25 um flash compiler unit in the present example, has been selected. As a result, the I/O device 106 may now display a screen 400, which may be a web page, for interacting with a user of the 0.25 um embedded flash compiler unit 302.

In this example, the 0.25 um flash compiler unit 302 comprises the interface program 118 and the memory compiler 116. In operation, through the screen display 400, the interface program 118 solicits user inputs to one or more parameters 402 for a memory instance 432, which may be sfc128kx8m64p4r2_100a, so that the user may customize his memory design.

The one or more parameters 402 may comprise a word depth 406, which may represent the number of words; a word width 408, which may represent the number of bits per word; a column mux option 410, which may represent the number of bit lines per input/output; a page option 412, which may allow four rows or eight rows per page; a power ring/ring replacement type 426, and pin routing layer parameters 428. It is also contemplated that the one or more parameters 402 may contain a fewer or a greater number of parameters, and that the parameters may differ from the parameters illustrated here.

In one embodiment, a valid input 414 to the word depth 406 may range from 1024 to 131072 (with an increment of a multiple of 128). In operation, as the input 414 is entered, the interface program 118 may evaluate its validity based on the above criteria. If the input 414 is invalid, the interface program 118 will prompt the user to enter another value. It is contemplated that the interface program 118 may supply a drop-down window or employ other methods for the user to supply the input 414.

An input 416 to the word width 408 is entered by selecting one of the available values from a drop-down window, which may be provided by the interface program 118. Likewise, input options to the column mux option 410 and the page option 412 may also be supplied by drop-down windows. Besides drop-down windows, it is contemplated that the interface program 118 may employ other formats to solicit user inputs to the word width 408, the column mux option 410, and the page option 412.

In one embodiment, to identify memory instances based on their specifications, the memory instance 432 comprises sfc (the multiple for the word depth 406)kx(the input 416)m(the input to the column mux option 410)p(the input to the page option 412).

After all the inputs to the one or more parameters 402 have been entered, a button 422, which may be entitled "timing specification", may be pressed, so that the interface program 118 will proceed to generate a datasheet for the memory instance 432. It will be understood that generating datasheets are known in the art, and will be described only briefly herein.

Referring now to FIG. 5, in one embodiment, the interface program 118 gathers inputs to the one or more parameters 402 for the memory instance 432, and creates a datasheet 500. To produce the datasheet 500, the interface program may utilize one or more libraries associated with the 0.25 um embedded flash compiler unit 302. Then, the interface program 118 or the multi-compiler interface 170 may display the datasheet 500.

In this illustration, the datasheet 500 includes the memory instance 432. The datasheet 500 may comprise three areas: an area information/configuration setting 500a, a power consumption specification 500b, and a timing specification 500c. It is contemplated that the datasheet 500 may comprise a fewer or a greater number of areas.

Referring now to the area information/configuration setting 500a, in this case, many of the inputs to the one or more parameters 402 of FIG. 4 are reflected here. It is contemplated that each of the area information/configuration setting 500a, the power consumption specification 500b, and the timing specification 500c may contain a fewer or a greater number of rows, columns, and/or parameters.

Referring again to FIG. 4, in one embodiment, a button 424, which may be entitled "next", may be pressed, so that the memory compiler 116 may generate design files (not shown) for the memory instance 432 based on the inputs to the one or more parameters 402.

Referring now to FIG. 7, in one embodiment, before design files are generated, a security program (not shown), which may be the interface program 118 or another program, may display a customer information screen 700 through the I/O device 106, and request a user to log in. It is contemplated that this user login process may be established at a different point. For example, a user may be required to log in before the screen display 400 of FIG. 4 is shown. It will be understood that programs for login confirmation are known in the art and will not be described in details herein.

In one embodiment, the interface program 118 may act as an intermediate between the I/O device 106 and the memory compiler 116. It may gather the inputs to the one or more parameters 402 for the memory instance 432, forward (which may comprise translating, transferring or employing other methods) them to the memory compiler 116, and invoke the memory compiler 116. It is contemplated that the memory compiler 116 may also interact directly with the I/O device 106 to gather the inputs to the one or more parameters 402 for the memory instance 432. It is further contemplated that without the assistance of the interface program 118, the memory compiler 116 may be invoked upon the confirmation of the login.

Referring now to FIG. 8, in one embodiment, if the memory compiler 116 is successfully invoked, then a system message screen 800, which may be generated by the interface program 118, the memory compiler 116, or other programs, may be displayed on the I/O device 106 to notify the user of the success.

In addition to the inputs to the one or more parameters 402 for the memory instance 432, the memory compiler 116 may utilize one or more libraries associated with the 0.25 um embedded flash compiler unit 302 to create design files for the memory instance 432. It will be understood that generating design files are known in the art, and will not be described in details herein.

In one embodiment, the interface program 118, the memory compiler 116, or other programs, may send the user an email message, which may comprise a hyperlink to a web page showing the progress of generating the design files. It is contemplated that other notification methods may also be employed to interact with the user.

After the memory compiler 116 has completed the job of generating design files for the memory instance 432, it will store them in one or more directories, which may be located at a system transfer protocol (FTP) server. The memory compiler 116, or other programs, may then notify the user, such as by emailing, of the completion of the job, and provide instructions on how to access the design files at the FTP server. FIG. 9 illustrates an exemplary list of design files.

Referring back to FIG. 4, in one embodiment, as a user enters inputs to the one or more parameters 402 for the memory instance 432, the interface program 118 may calculate and display corresponding memory instance ratios 430, which may comprise a height, width, size, and aspect ratio for the memory instance 432; and draw a corresponding footprint 416 of the memory instance 432. As a result, the user can receive instant feedback of what his specifications will produce, and can adjust his design accordingly. It is contemplated that the memory instance ratios 430 may comprise a fewer or a greater number of items.

Step 208 of FIG. 2.

In one embodiment, to facilitate comparison of timing specifications, a single datasheet comprising multiple memory instances may be generated. Referring again to FIG. 5, a user is given the option to select a button 504, which may be entitled "Add a new IP". Under that option, after soliciting user specifications to customize the design of a current memory instance, the interface program 118 or the multi-compiler interface 170 will create a datasheet comprising the current memory instance and previous memory instances.

Figure 10:
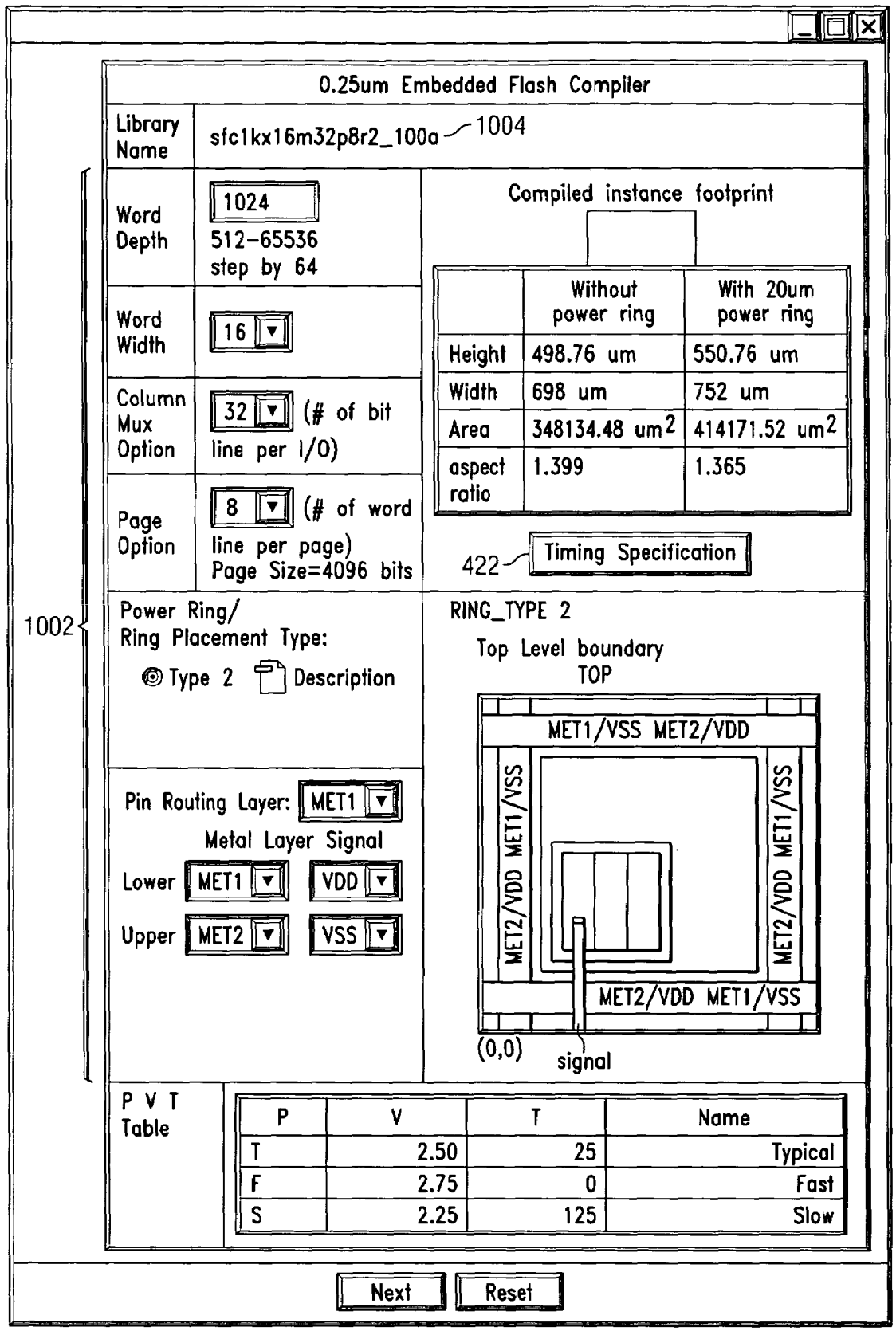
FIG. 10 illustrates an exemplary screen display for soliciting inputs to parameters.

Referring now to FIG. 10, in one embodiment, new inputs to one or more parameters 1002 may be entered to create a memory instance 1004, and the interface program 118 may create a datasheet comprising the memory instance 1004.

In one embodiment, the interface program 118 or the multi-compiler interface 170 may combine the datasheet comprising the memory instance 1004 and the datasheet comprising the memory instance 432, and create a combination datasheet 1100 for display. A variety of conventional means may be employed for the multi-compiler interface 170 to gain access to the datasheets comprising the memory instances 1004 and 432, respectively. For example, the interface program 118 may save the datasheets comprising the memory instances 1004 and 432, respectively, in a directory accessible to the multi-compiler interface 170, so that the multi-compiler interface 170 may obtain those datasheets, and combine and arrange them into a single combination datasheet for display. In another example, the multi-compiler interface 170 may simply interact with the interface program 118 to access the datasheets. The interface program 118 or the multi-compiler interface 170 may arrange the memory instances 1004 and 432 in a format that enables a user to easily compare their timing specifications. Besides the format illustrated in FIG. 11, is contemplated that the memory instances 1004 and 432 may be arranged in other formats that are conducive to the purpose of comparing timing specifications. It is also contemplated that the datasheet 1100 may comprise more than two memory instances.

It is further contemplated the multi-compiler interface 170 may generate a combination datasheet that comprises memory instances created by different memory compiler units.

Referring back to FIG. 5, in one embodiment, a user is given an option 506 to save the datasheet 500 as a file, which may be an Excel file or any other type of file; and an option 508 to clean all previous datasheets. Under option 506, the interface program 118 may generate an excel file and save it at a directory reachable by the user. Under option 508, the interface program 118 may erase the current datasheet 50—contrary to the option 504, a new datasheet will contain only the latest memory instance.

Referring now to FIG. 6, in one embodiment, before a datasheet 500 is generated, a user may be requested to confirm the inputs to the one or more parameters 402 by pressing a button 602, which may be entitled "confirm".

In another embodiment, the interface program 118, or another program, will map the user identification to her access privilege. For example, some users may be granted full access to all of the libraries associated with the 0.25 um embedded flash compiler unit 302, while other users may have only limited access to certain libraries.

Referring back to FIG. 3, in one embodiment, the 0.13 um dual port SRAM compiler unit 303 may be selected according to the method 200. Subsequently, an underlying file, which may be a HTML file, may cause a new screen, which is associated with the 0.13 um dual port SRAM compiler unit 303, to be displayed.

Figure 12:
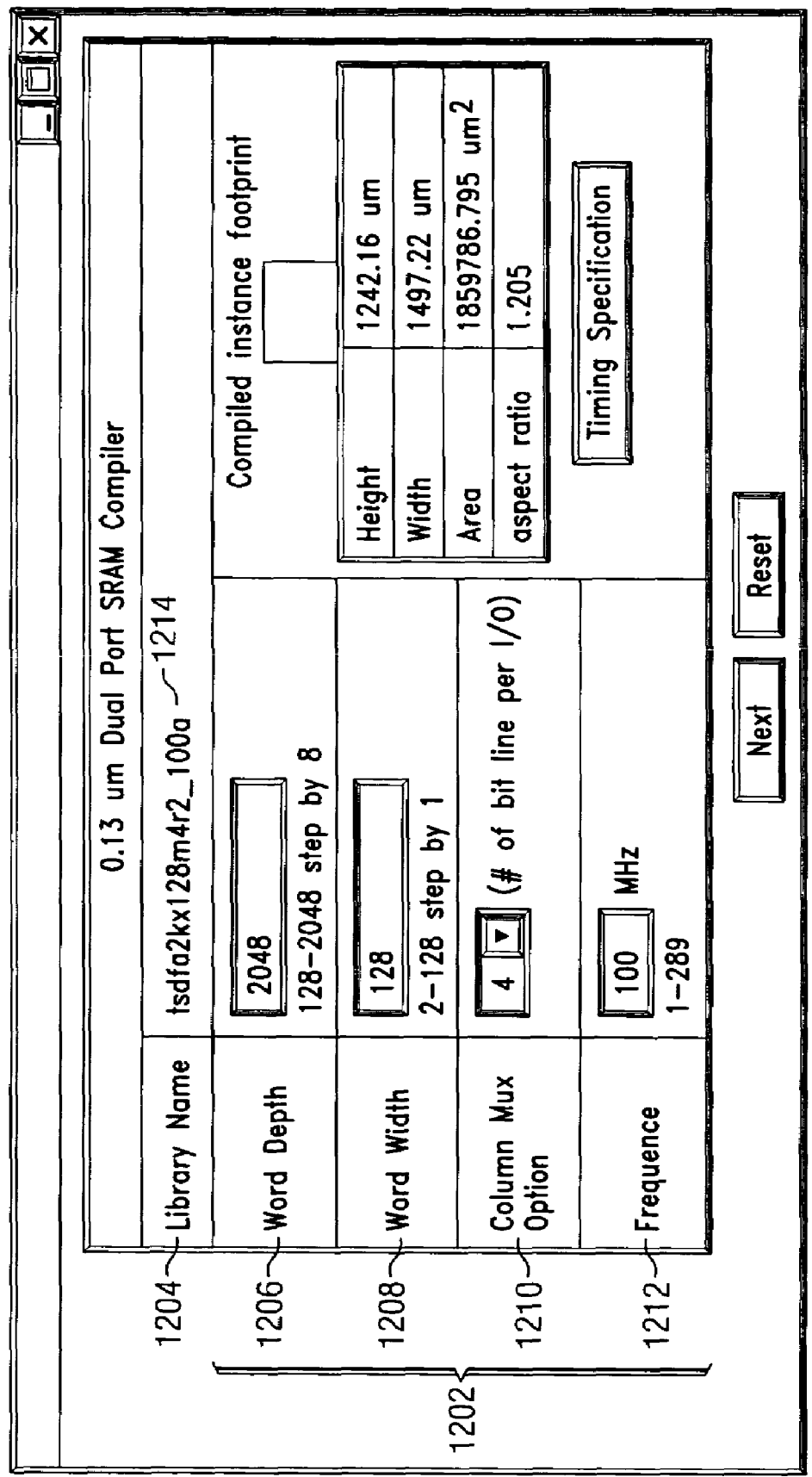
FIG. 12 illustrates an exemplary screen display for soliciting input to parameters.

Referring now to FIG. 12, the I/O device 106 may comprise a screen display 1200, which may be a web page, for the 0.13 um dual port SRAM compiler unit 303.

In this example, the 0.13 um dual port SRAM compiler system comprises the interface program 124 and the memory compiler 122. Referring now to FIG. 12, in one embodiment, through the screen display 1200, which may be a web page, the interface program 124 solicits user inputs to one or more parameters 1202 for a memory instance 1214. Here, the one or more parameters 1202 may comprise a word depth 1206, a word width 1208, a column mux option 1210, and a frequence 1212. It is contemplated that the one or more parameters 1202 may contain a fewer or a greater number of parameters, and that the parameters may differ from the parameters illustrated here.

The interface program 124 may verify inputs to the one or more parameters 1202 for the memory instance 1214, and reject invalid entries. After all the inputs to the one or more parameters 1202 have been entered, the interface program 124 may gather them and generate a datasheet 1300 for the memory instance 1214, which is illustrated in FIG. 13. To generated the datasheet 1300, the interface program 124 may utilize libraries associated with the 0.13 um dual port SRAM compiler unit 303.

In one embodiment, the interface program 124 may save the datasheet 1300 as an excel file at a location accessible to the user.

In another embodiment, according to the step 208 of FIG. 2, the multi-compiler interface 170 may combine the datasheets 1300 and 500 to create a combination datasheet (not shown) that includes memory instances 1214 and 432. A variety of conventional means may be employed for the multi-compiler interface 170 to gain access to the datasheets comprising the memory instances 1214 and 432, respectively. For example, the interface programs 124 and 118 may save the datasheets comprising the memory instances 1214 and 432, respectively, in a directory (or directories) accessible to the multi-compiler interface 170, so that the multi-compiler interface 170 may obtain those datasheets, and create a single combination datasheet for display. In another example, the multi-compiler interface 170 may simply interact with the interface programs 118 and 124 to access the datasheets.

In one embodiment, the memory compiler 122 may compile design files for the memory instance 1214 based on the inputs to the one or more parameters 1202 and libraries associated with the 0.13 um dual port SRAM compiler unit 303. The memory compiler 122 may directly interact with the I/O device 106 to gather the inputs to the one or more parameters 1202, or rely on the interface program 124 to gather those inputs for its consumption. FIG. 14 illustrates an exemplary list of design files generated by the memory compiler 122.

Although only a few exemplary embodiments of this invention have been described in detail above, those skilled in the art will readily appreciate that many modifications are possible in the exemplary embodiments without materially departing from the novel teachings and advantages of this invention. Also, features illustrated and discussed above with respect to some embodiments can be combined with features illustrated and discussed above with respect to other embodiments. Accordingly, all such modifications are intended to be included within the scope of this invention.

We claim:

1. A method for accessing a plurality of memory compiler units, the method comprising:
   prompting, via a multi-compiler interface, for a selection of a first memory compiler unit from a plurality of memory compiler units;
   remotely linking to the selected first memory compiler unit; and
   generating a combination datasheet comprising a plurality of memory instances.

2. The method of claim 1 further comprising:
   prompting, via the multi-compiler interface, for a selection of a second memory compiler unit from the plurality of memory compiler units;
   remotely linking to the selected second memory compiler unit; and
   generating the combination datasheet comprising a plurality of memory instances created by both the first and second memory compiler units.

3. The method of claim 2 further comprising:
   displaying the combination datasheet on a web page.

4. The method of claim 1 wherein the plurality of memory compiler units are provided on separate servers.

5. The method of claim 1 further comprising providing the plurality of memory compiler units on at least two separate servers.

6. The method of claim 1 further comprising providing the multi-compiler interface and the plurality of memory compiler units on at least two separate servers.

7. The method of claim 1 wherein the prompting comprises:
   requesting a user to select a link to the first memory compiler unit.

8. The method of claim 1 wherein remotely linking to the selected first memory compiler unit comprises:
   displaying a web page associated with the selected first memory compiler unit.

9. The method of claim 1 wherein remotely linking to the selected first memory compiler unit comprises:
    soliciting inputs to one or more parameters through a web-based screen display.

10. The method of claim 1 wherein remotely linking to the selected first memory compiler unit comprises:
    calculating memory instance ratios based on the inputs and displaying the memory instance ratios on a web page.

11. The method of claim 1 wherein remotely linking to the selected first memory compiler unit comprises:
    creating a footprint based on the inputs and displaying the footprint on a web page.

12. The method of claim 1 wherein remotely linking to the selected first memory compiler unit comprises:
    storing the design files on a FTP server.

13. A computer readable medium comprising a plurality of instructions for execution by at least one computer processor, wherein the instructions are for:
    prompting a user to select a memory compiler unit;
    linking to a selected memory compiler unit; and
    generating a combination datasheet comprising a plurality of memory instances wherein at least two of the plurality of memory instances are created by different memory compiler units.

14. The computer readable medium of claim 13 further comprising providing a plurality of memory compiler units accessible through a multi-compiler interface.

15. The computer readable medium of claim 13 further comprising displaying the combination datasheet on a web page.

16. The computer readable medium of claim 13 wherein linking to the selected memory compiler unit comprises:
    soliciting inputs to one or more parameters through a web page.

17. The computer readable medium of claim 13 further comprising displaying memory instance ratios on a web page.

18. The method of claim 12 further comprising displaying a footprint on a web page.

19. A system for providing a combination datasheet to a remote computer, the system comprising one or more servers having a plurality of memory compiler units wherein each memory compiler unit comprises a program for assisting a multi-compiler interface to generate a combination datasheet wherein the combination datasheet comprises memory instances created by at least two of the plurality of memory compiler units.

20. The system of claim 19 wherein the plurality of memory compilers reside on at least two servers.

* * * * *